(12) United States Patent
Rajendran

(10) Patent No.: US 7,788,725 B2
(45) Date of Patent: Aug. 31, 2010

(54) METHOD AND SYSTEM FOR PROBING FCODE IN PROBLEM STATE MEMORY

(75) Inventor: Arokkia Antonisamy Rajendran, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1116 days.

(21) Appl. No.: 11/326,557

(22) Filed: Jan. 5, 2006

(65) Prior Publication Data

US 2007/0159879 A1    Jul. 12, 2007

(51) Int. Cl.
*G06F 12/14* (2006.01)

(52) U.S. Cl. .................. 726/25; 711/153; 713/164; 713/165; 713/166; 713/167; 710/313; 710/314; 710/315; 365/174

(58) Field of Classification Search ............ 711/153; 726/25; 713/164–167; 710/313–315; 365/174
See application file for complete search history.

(56) References Cited

U.S. PATENT DOCUMENTS

| 4,931,922 | A | * | 6/1990 | Baty et al. ............ 714/9 |
| 5,630,076 | A | * | 5/1997 | Saulpaugh et al. ........ 710/104 |
| 5,958,049 | A | | 9/1999 | Mealey et al. |
| 6,219,828 | B1 | | 4/2001 | Lee |
| 6,289,448 | B1 | | 9/2001 | Marsland |
| 6,349,355 | B1 | * | 2/2002 | Draves et al. ........... 711/6 |
| 6,357,021 | B1 | | 3/2002 | Kitagawa et al. |
| 6,839,892 | B2 | | 1/2005 | Dawkins et al. |
| 6,978,018 | B2 | * | 12/2005 | Zimmer ............... 380/30 |
| 7,127,579 | B2 | * | 10/2006 | Zimmer et al. ........... 711/163 |
| 7,289,442 | B1 | * | 10/2007 | Srinivasan et al. ........ 370/230 |
| 2003/0212897 | A1 | | 11/2003 | Dickerson et al. |
| 2004/0054842 | A1 | * | 3/2004 | Tse .................. 710/313 |
| 2004/0153635 | A1 | | 8/2004 | Kaushik et al. |
| 2007/0028228 | A1 | * | 2/2007 | Battista et al. .......... 717/168 |
| 2007/0159879 | A1 | * | 7/2007 | Rajendran ............ 365/174 |

OTHER PUBLICATIONS

Stillerman, et al.; Demonstration: Efficient Code Certification for Open Firmware; IEEE Computer Society; Proceedings of the DARPA Information Survivability Conference and Exposition (DISCEZ'03); 0-76950189704/03; 2 pages.

(Continued)

*Primary Examiner*—Thanhnga B Truong
*Assistant Examiner*—Angela Holmes
(74) *Attorney, Agent, or Firm*—Schmeiser, Olsen & Watts; William H. Steinberg

(57) ABSTRACT

A method and system for probing FCode in problem state memory. A PCI device is detected from a PCI-PCI bridge node included in a device tree. A child node for the detected PCI device is created in problem state memory. The active package is switched to the child node, and the processor switches from running in privileged mode to running in problem mode. FCode of an FCode driver in the PCI device is probed. Data, properties and methods generated in response to the probe are created in problem state memory. After the probe is complete, the active package is switched to the parent node of the child node, and the processor switches back to running in privileged mode.

17 Claims, 7 Drawing Sheets

OTHER PUBLICATIONS

Stillerman, et al.; Malicious Code Detection for Open Firmware; IEEE Computer Society; Proceedings of the 18th Annual Computer Security Applications Conference (ACSAC'02); 1063-9527/02; 10 pages.

IEEE Standard for Boot (Initialization Configuration) Firmware: Bus Supplement for IEEE 896 (Futurebus+); IEEE Std 1275.4-1995 (Supplement to IEEE Std 1275-1994); ISBN 1-55937-580-9; 16 pages.

* cited by examiner

METHOD AND SYSTEM FOR PROBING FCODE IN PROBLEM STATE MEMORY

BACKGROUND OF THE INVENTION

1. Technical Field

The present invention relates to a method and system for probing FCode in problem state memory.

2. Related Art

During a boot process or a hot plug operation, FCode of an FCode driver that resides in a PCI card attached to a computing system is probed. During the probe, Open Firmware evaluates the FCode driver in an address space in privileged mode, thereby making any malicious code in the FCode driver a security threat. In circumstances where Open Firmware co-exists in memory with the computing system's operating system, this security threat is especially dangerous, as the operating system may be disabled by the malicious code as a result of probing the FCode. Such circumstances exist when a PCI card is installed at runtime (e.g., a hot plug operation). Thus, there exists a need for an improved technique of probing FCode.

SUMMARY OF THE INVENTION

In first embodiments, the present invention provides a method of probing FCode in a problem state memory in a computing environment, the method comprising:

allocating memory space to Open Firmware residing in a computing system, the memory space divided into a problem state memory and a privileged state memory;

detecting a peripheral device connected to the computing system, wherein the peripheral device includes memory in which FCode resides, and wherein the detecting is performed by a first device node included in a device tree provided by the Open Firmware;

creating a second device node in the device tree, the second device node including a package of private data, properties and methods, the package associated with the peripheral device, the second device node residing in the problem state memory;

switching an active package managed by the Open Firmware to the package included in the second device node, the active package including methods accessible to a command interpreter of the computing system;

copying a machine code version of the FCode into the problem state memory; and executing the machine code version in the problem state memory, the executing generating and adding to the package in the problem state memory, at least one of: additional private data, an additional one or more properties and an additional one or more methods.

In second embodiments, the present invention provides a system for probing FCode in a problem state memory in a computing environment, the system comprising:

means for allocating memory space to Open Firmware residing in a computing system, the memory space divided into a problem state memory and a privileged state memory;

means for detecting a peripheral device connected to the computing system, wherein the peripheral device includes memory in which FCode resides, and wherein the detecting is performed by a first device node included in a device tree provided by the Open Firmware;

means for creating a second device node in the device tree, the second device node including a package of private data, properties and methods, the package associated with the peripheral device, the second device node residing in the problem state memory;

means for switching an active package managed by the Open Firmware to the package included in the second device node, the active package including methods accessible to a command interpreter of the computing system;

means for copying a machine code version of the FCode into the problem state memory; and means for executing the machine code version in the problem state memory, the executing generating and adding to the package in the problem state memory, at least one of: additional private data, an additional one or more properties and an additional one or more methods.

In third embodiments, the present invention provides a computer program product comprising a computer-usable medium including computer-usable program code for probing FCode in a problem state memory in a computing environment, the computer program product including:

computer-usable code for allocating memory space to Open Firmware residing in a computing system, the memory space divided into a problem state memory and a privileged state memory;

computer-usable code for detecting a peripheral device connected to the computing system, wherein the peripheral device includes memory in which FCode resides, and wherein the detecting is performed by a first device node included in a device tree provided by the Open Firmware;

computer-usable code for creating a second device node in the device tree, the second device node including a package of private data, properties and methods, the package associated with the peripheral device, the second device node residing in the problem state memory;

computer-usable code for switching an active package managed by the Open Firmware to the package included in the second device node, the active package including methods accessible to a command interpreter of the computing system;

computer-usable code for copying a machine code version of the FCode into the problem state memory; and computer-usable code for executing the machine code version in the problem state memory, the executing generating and adding to the package in the problem state memory, at least one of: additional private data, an additional one or more properties and an additional one or more methods.

In fourth embodiments, the present invention provides a method for deploying computing infrastructure, comprising integrating computer-readable code into a computing system, wherein the code in combination with the computing system is capable of performing a process of probing FCode in a problem state memory in a computing environment, the process comprising:

allocating memory space to Open Firmware residing in a computing system, the memory space divided into a problem state memory and a privileged state memory;

detecting a peripheral device connected to the computing system, wherein the peripheral device includes memory in which FCode resides, and wherein the detecting is performed by a first device node included in a device tree provided by the Open Firmware;

creating a second device node in the device tree, the second device node including a package of private data, properties and methods, the package associated with the peripheral device, the second device node residing in the problem state memory;

switching an active package managed by the Open Firmware to the package included in the second device node, the active package including methods accessible to a command interpreter of the computing system;

copying a machine code version of the FCode into the problem state memory; and executing the machine code version in the problem state memory, the executing generating and adding to the package in the problem state memory, at least one of: additional private data, an additional one or more properties and an additional one or more methods.

Advantageously, the present invention provides a secure, fault-tolerant FCode probing mechanism when Open Firmware co-exists in memory with an operating system. Further, the FCode probing technique described herein uses existing FCode device drivers as they are originally supplied by vendors, therefore avoiding the costly rewriting of FCode drivers to use predefined interfaces. Still further, the present invention is not a static scheme; instead it provides secure FCode probing at runtime (e.g., during a hot plug of a PCI card).

DETAILED DESCRIPTION OF THE INVENTION

Introduction

Figure 1A:
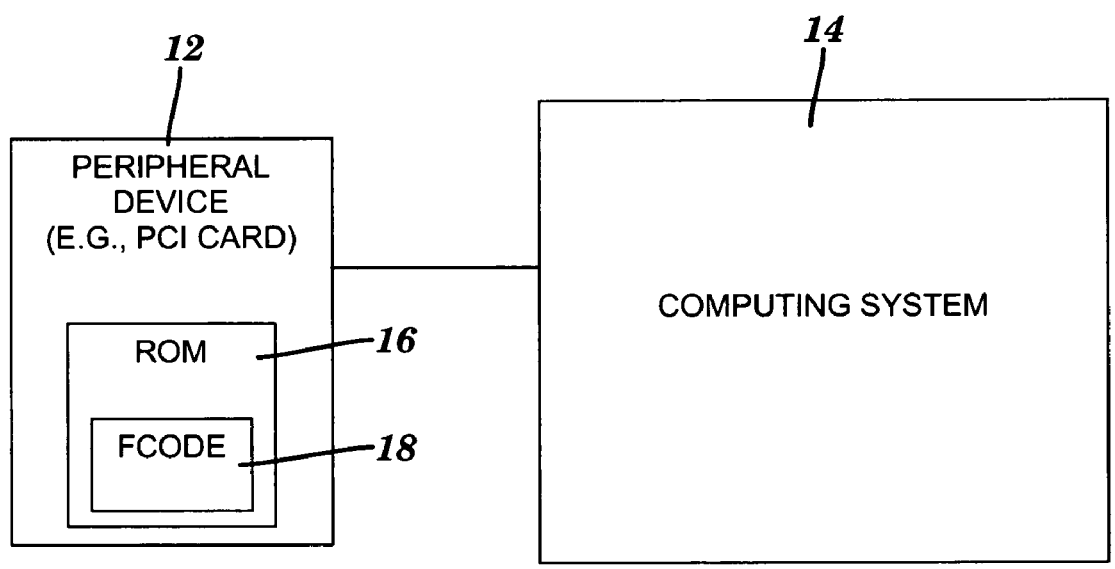
FIG. 1A is a block diagram of a system for probing FCode in problem state memory, in accordance with embodiments of the present invention.

The present invention provides a technique for probing (i.e., locating and evaluating) FCode of an FCode driver in problem state memory to eliminate the risk of malicious code or non-malicious bugs in an FCode driver disabling an operating system that is loaded, running and co-existing in memory with Open Firmware. The probing process is implemented in a system 10 of FIG. 1A. System 10 includes a peripheral device 12 and a computing system 14. Peripheral device 12 is any device that uses an FCode driver. In one embodiment, peripheral device 12 is a Peripheral Component Interconnect (PCI) card. PCI is a computer busing architecture that defines electrical and physical standards for electronic interconnections between peripheral devices and a computer motherboard. A PCI card (a.k.a. PCI adapter or PCI I/O adapter) is a printed circuit board that can be inserted into an expansion slot (not shown) of the motherboard of computing system 14 to add functionality to the computing system. Other examples of peripheral devices that use an FCode driver include expansion cards based on PCI Express, PCI-X, miniPCI, compactPCI, PC/104-Plus and Accelerated Graphics Port (AGP).

Hereinafter, for simplicity, peripheral device 12 is referred to as a PCI card or PCI adapter, but the present invention may be applied to any FCode driver-based device, as described above.

PCI card 12 includes read-only memory (ROM) 16. A PCI card vendor develops source FCode and converts it into binary FCode 18, which resides in ROM 16. PCI card 12 is installed in computer system 14, which can be, for instance, a pSeries server available from International Business Machines Corporation of Armonk, N.Y. FCode 18 is the FCode driver needed to use PCI card 12. During hot plugging or during the boot process of computing system 14, FCode 18 is converted into machine code and is executed. Computing systems such as recent pSeries servers support runtime installation of PCI card 12 (i.e., hot plugging), and FCode may be probed at that time.

Definitions

The following definitions apply to terminology used herein:

1. Privileged state: An operating state of a processor of a computing system in which software (typically the operating system) can access all system resources via privileged operations (e.g., can access all control registers and the supervisor memory space). Privileged state is also referred to as privileged mode or supervisor mode.

2. Problem state: A non-privileged operating state of a processor of a computing system. When running in problem state, the processor has access to limited resources of the system. For example, software running in problem state can access only certain control registers and can access only user memory space. Problem state is typically used by application software and no privileged operations can be performed in this state. Problem state is also known as problem mode or user mode.

3. Firmware: The software based in read-only memory that controls a computing system between the time the system is powered on and the time the primary operating system takes control of the system. Loading (or booting) the operating system is one of the responsibilities of firmware.

4. Open Firmware: Firmware defined by the IEEE Standard 1275-1994: Standard for Boot (Initialization Configuration) Firmware (hereinafter, IEEE Standard 1275). The Open Firmware is independent of the hardware environment and operating system of the computing system. Open Firmware provides (1) a mechanism for loading and executing programs (e.g., operating systems); (2) a process for identifying plug-in devices; and (3) firmware and diagnostics drivers for the plug-in devices.

5. FCode: A computer programming language defined by IEEE Standard 1275. FCode is a machine-independent interpreted language that is similar to the Forth programming language. FCode is encoded as a sequence of binary byte codes representing a defined set of Forth definitions.

6. FCode driver: A plug-in device driver written in FCode, intended for use by Open Firmware and its client programs, and located in read-only memory (ROM) on a peripheral device that is added to a computing system. Typically, an FCode driver is loaded into main memory during the boot cycle. An FCode driver can also be loaded into main memory during a hot plug operation.

7. FCode evaluator: The portion of Open Firmware that processes FCode programs by reading a sequence of bytes representing FCode numbers, and executing or compiling the associated FCode functions.

8. FCode number: A number from 0 to 4095 that denotes a particular FCode function. An FCode number is conventionally written in hexadecimal as 0x00 to 0x0FFF.

9. FCodefunction: A self-contained procedural unit of the FCode programming language to which an FCode number may be assigned.

Figure 6:
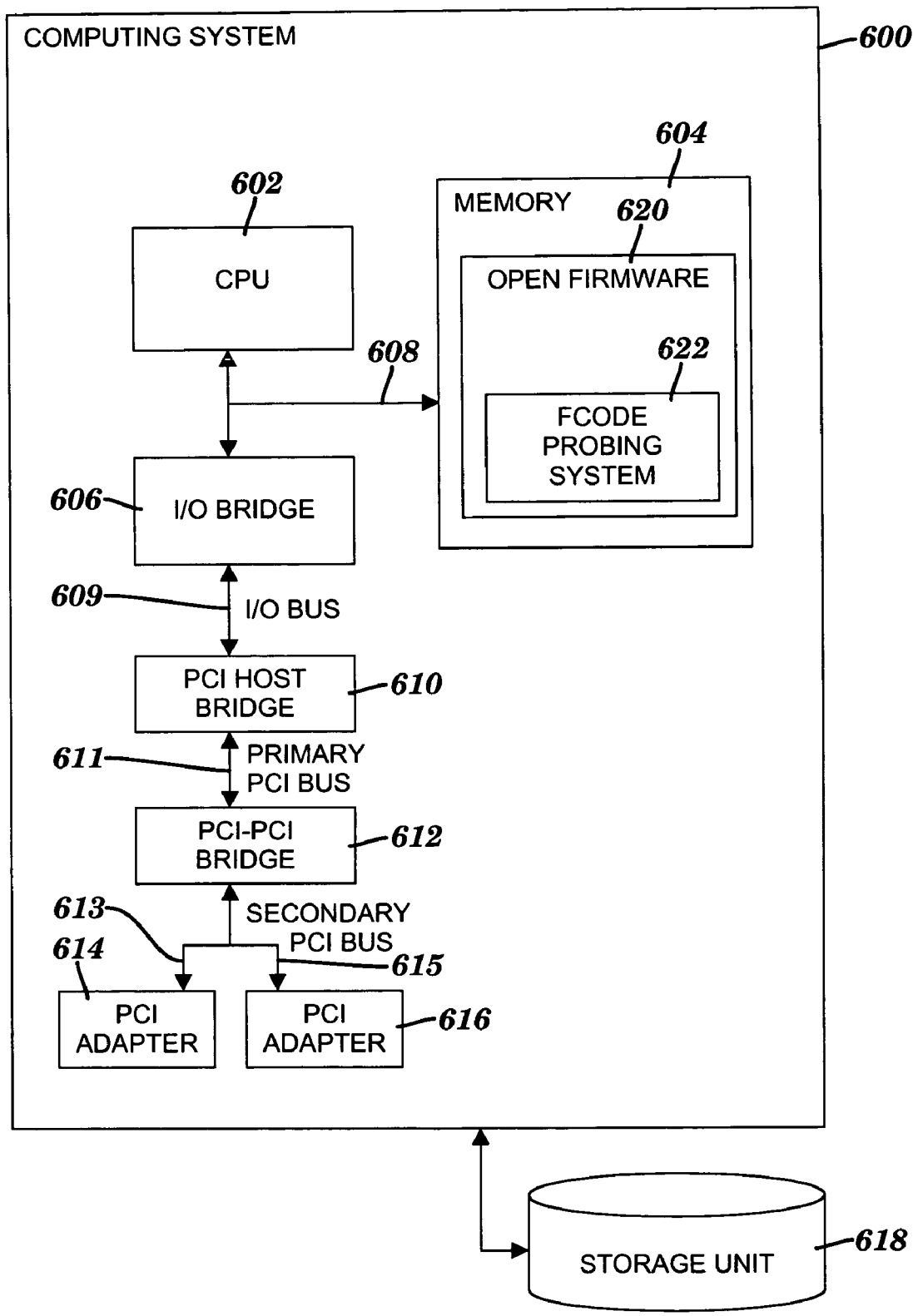
FIG. 6 is a block diagram of a computing system for implementing the method of FIG. 1B, in accordance with embodiments of the present invention.

8. FCode probing: The process of locating and evaluating an FCode program performed by a portion of Open Firmware residing in computing system 14. An FCode evaluator residing in Open Firmware performs the evaluation part of FCode probing. The portion of Open Firmware that performs FCode probing is shown in FIG. 6 (see FCode probing system 622).

9. Tokenizer: A development tool that converts FCode source code into a binary FCode program. The conversion of source FCode into binary FCode is defined by the IEEE standard 1275.

10. Device tree: A hierarchical data structure provided by Open Firmware. The device tree is accessible by the operating system and represents the physical configuration of a computing system. The device tree describes the properties of the system's devices and the devices' relationships to one another. Open Firmware elements such as devices, buses, and libraries of software procedures are named by and located via the device tree.

11. Device node: A particular entry (i.e., branch) in the device tree, and usually describes a single device or bus. A device node consists of properties, methods and private data. A device node may have multiple child nodes in the hierarchy of the device tree. A device node has exactly one parent node (i.e., the node to which the device node is attached), except the root node, which has none. A child node (i.e., any device node except the root node) is a device node that descends from another node in the hierarchy of the device tree.

12. Package: The combination of a device node's properties, methods and private data. As used herein, the terms "package" and "device node" are used interchangeably.

13. Phandle: A cell-sized datum identifying a particular package.

14. Instance or package instance: A data structure resulting from the opening of a particular package. A package instance consists of a set of values for (i.e., a working copy of) the package's private data.

15. Active package: The package, if any, whose methods are accessible by name to a command interpreter, and to which newly created methods and properties are added.

16. Current instance: The package instance whose private data is currently available.

17. Private data: Data, associated with a package, that is used by the methods of that package but is not intended for use by other software.

FCode Probing Process

Figure 1B:
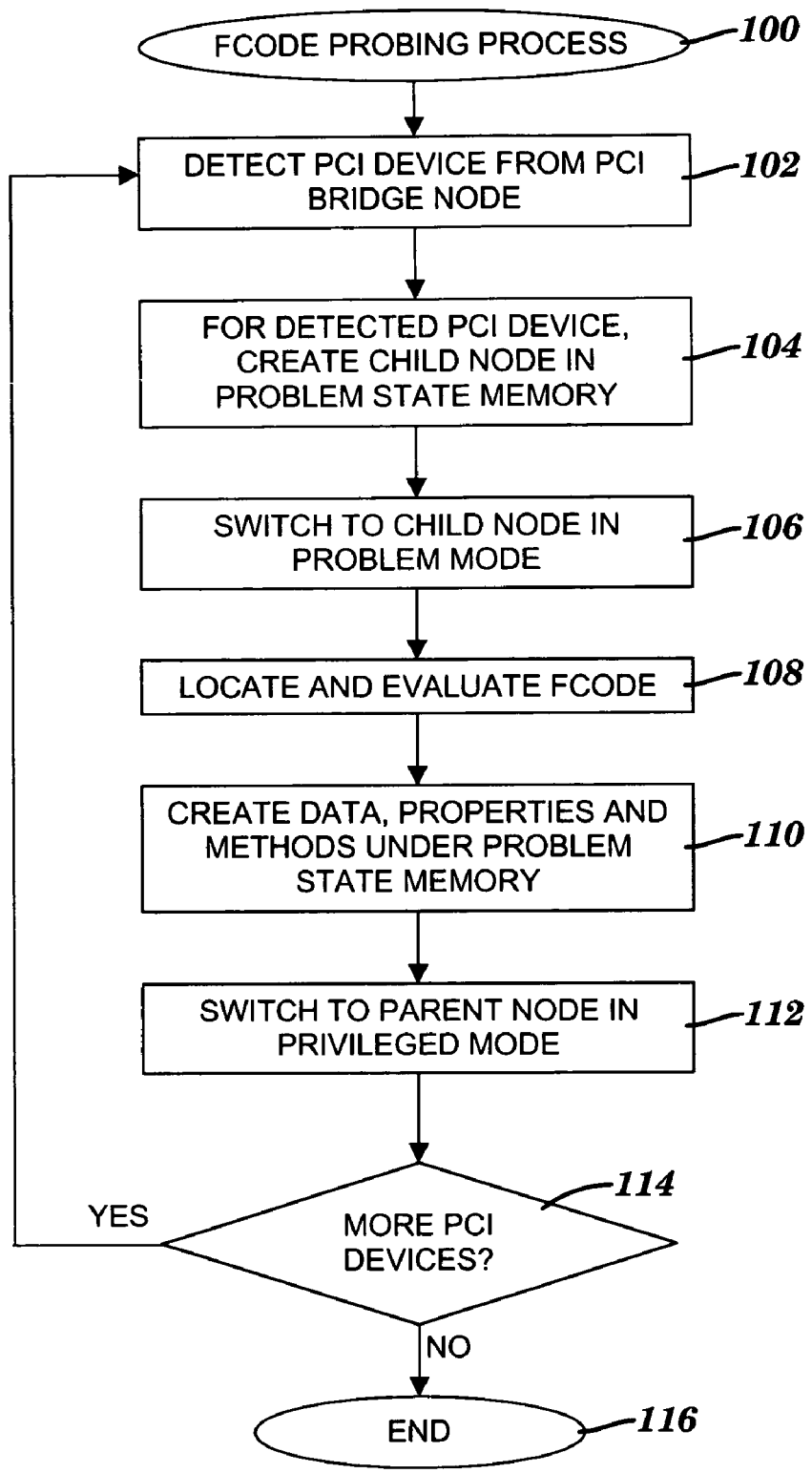
FIG. 1B is a flow chart of a method of probing FCode in problem state memory, implemented in the system of FIG. 1A, in accordance with embodiments of the present invention.

FIG. 1B is a flow chart of a method of probing FCode in problem state memory, in accordance with embodiments of the present invention. The process of probing FCode in problem state memory begins at step 100 with a scan of PCI devices from a PCI-PCI bridge node residing in computing system 14 (see FIG. 1A). In step 102, a PCI device is detected from the PCI-PCI bridge node. In step 104, a child node corresponding to the detected PCI device is created in problem state memory. Private data, properties and methods for the newly created child node are also generated in step 104. In step 106, Open Firmware changes the active package to the child node created in step 104, and switches the processor from running in privileged mode to running in problem mode. Open Firmware resides in computing system 14 (see FIG. 1A) and is shown in FIG. 6.

In step 108, a probing phase begins as FCode 18 (see FIG. 1A) of an FCode driver is located and evaluated by a portion of Open Firmware residing on computing system 14 (see FIG. 1A). An FCode evaluator residing in the Open Firmware performs the evaluation portion of the FCode probing phase, which includes reading FCode 18 (see FIG. 1A) from PCI card 12, converting FCode 18 (see FIG. 1A) into machine code, copying the converted machine code into problem state memory, and executing the machine code. In step 110, private data, properties, and methods generated by the evaluation of the FCode are added in problem state memory to the child node created in step 104. In step 112, which is performed by the Open Firmware, the active package is switched to the parent node of the child node created in step 104, and the processor switches from running in problem mode to running in privileged mode. In this case, the parent node is the PCI-PCI bridge node that detected the PCI device in step 102. This switch in step 112 is implemented, for example, via a system call interrupt. If inquiry step 114 determines that there are additional PCI devices to scan, the process repeats starting at step 102; otherwise, the FCode probing process ends at step 116.

Since probing the FCode in the process of FIG. 1B occurs in problem mode rather than in privileged mode, the FCode evaluation is done in a controlled environment where there is only limited access to the resources of computing system 14 (see FIG. 1A). In other words, if non-malicious bugs or malicious code reside in the FCode, then the probe of the FCode cannot crash, corrupt, or otherwise disable the operating system of computing system 14 (see FIG. 1A). This protection of the operating system is available even if the operating system and Open Firmware co-exist in system memory. Moreover, this protection against malicious code and non-malicious bugs is provided at runtime (e.g., during a hot plug of PCI card 12 of FIG. 1A).

Figure 2:
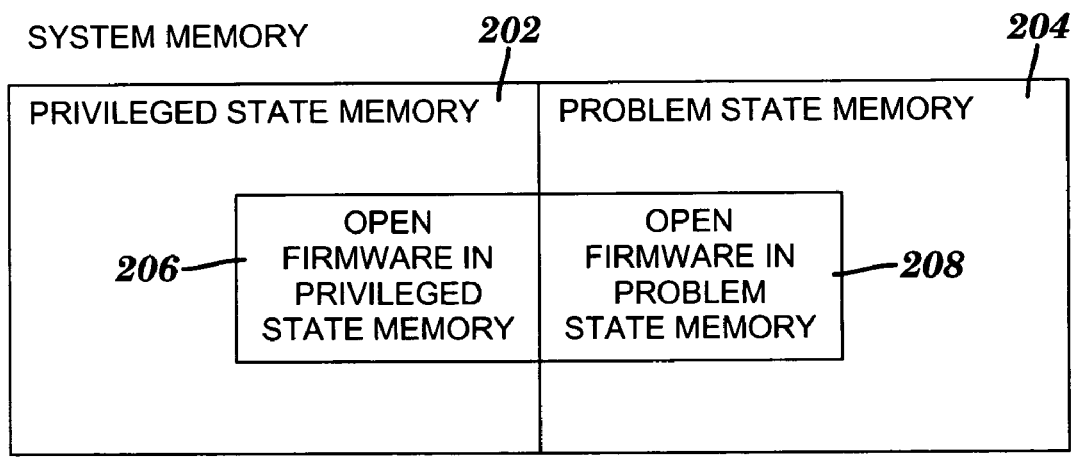
FIG. 2 is a block diagram of memory of a system implementing the method of FIG. 1B, in accordance with embodiments of the present invention.

FIG. 2 is a block diagram of memory of a system implementing the method of FIG. 1B, in accordance with embodiments of the present invention. System memory 200 resides in computing system 14 (see FIG. 1A) and includes memory space allocated to privileged state memory 202 and problem state memory 204. Open Firmware residing in system memory 200 is divided into two parts: Open Firmware in privileged state memory 206 and Open Firmware in problem state memory 208. Open Firmware in privileged state memory 206 stores privileged nodes' data (e.g., word lists, property lists and variables). Open Firmware in problem state memory 208 stores problem nodes' data (e.g., word lists, property lists and variables). Privileged nodes and problem nodes are discussed below relative to FIG. 3. Values for variables such as active package are assigned in two sets: one set for use when the processor of system 14 (see FIG. 1A) is running in privileged mode, and one set for use when the processor is running in problem mode.

Figure 3:
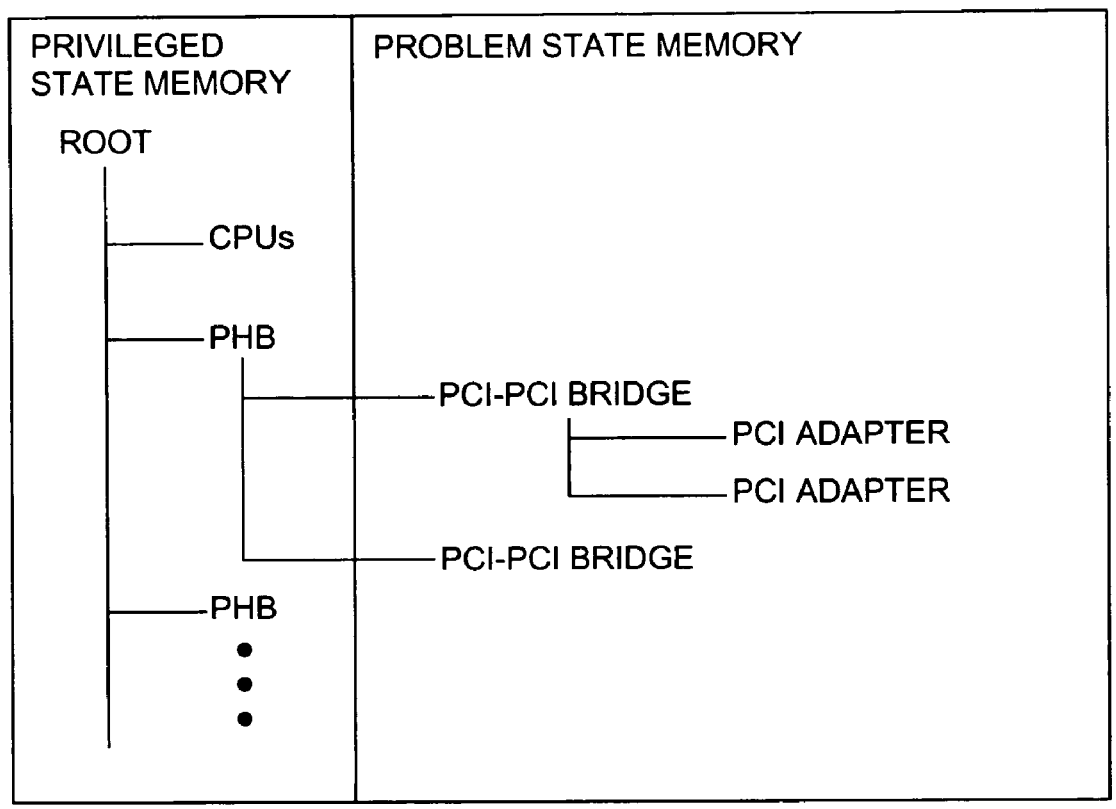
FIG. 3 depicts a device tree included in the memory of FIG. 2, in accordance with embodiments of the present invention.

FIG. 3 depicts a device tree included in the memory of FIG. 2, in accordance with embodiments of the present invention. A device tree 300 residing in system memory 200 (see FIG. 2) includes multiple device nodes, including PHBs (PCI host bridges), PCI-PCI bridges and PCI adapters. The PCI-PCI bridges in FIG. 3 are child nodes of a PHB, and the two PCI adapters are child nodes of one of the PCI-PCI bridges.

Device nodes in a device tree are classified into two categories: privileged (i.e., trusted) nodes and problem (i.e., untrusted) nodes. In device tree 300, the private data, properties and methods of the child nodes of the PCI-PCI bridge are in problem state memory 204 (see FIG. 2), while the other device nodes' data, properties and methods are in privileged state memory 202 (see FIG. 2). When the active package is a problem node or when the current instance is an instance of a problem node, the processor of computing system 14 (see FIG. 1A) runs in problem mode. When the active package is a privileged node, or when the current instance is an instance of a privileged node, the processor of computing system 14 (see FIG. 1A) runs in privileged mode. Only problem nodes probe FCode 18 (see FIG. 1A); FCode 18 (see FIG. 1A) is never probed by a privileged node.

Device tree 300 is created in two phases: a device tree creation phase (see step 104 of FIG. 1B) and an FCode probe phase (see step 108 of FIG. 1B). The device tree creation phase presents a special case regarding the relationship between the active package and the mode in which the processor runs. That is, during the device tree creation phase, processor runs in privileged state irrespective of the active package. Running the processor in privileged state during the device tree creation phase does not present a safety concern relative to the operating system because the FCode is not in system memory yet. Further, privileged nodes of device tree 300 are created in privileged memory and problem nodes are created in problem memory.

The following code constructs a device tree such as device tree 300:

```
...
new-device
    "name-of-privileged-node" device-name
    "type-of-privileged-node" device-type
        problem-state start
            new-device
                "name-of-problem-node" device-name
                "type-of-problem-node" device-type
            finish-device
        problem-state end
    finish-device
new-device
    "name-of-another-privileged-node" device-name
finish-device
...
```

The code presented above creates the following device tree:

```
...
/name-of-privileged-node
    /name-of-problem-node
/name-of-another-privileged node
...
```

The code presented above uses the following FCode functions:

(1) new-device: Creates a new device node as a child of the active package and makes the new node the active package. The new-device function also creates a new instance and makes it the current instance. The instance that invoked new-device becomes the parent instance of the new instance.

(2) finish-device: Completes a device that was created by new-device. In this case, the current values of the current instance's initialized data items are saved within the active package for later use in initializing the data items of instances created from that node. The current instance is destroyed, and the parent instance is made the current instance. The parent node of the device node just completed is made the active package again.

(3) device-name: Creates a property name in the active package to define the name of the package.

(4) device-type: Creates a property in the active package whose property name is "device-type," which specifies the set of methods implemented by the package.

(5) problem-state start: A new FCode function that indicates that subsequent device nodes (up to the next occurrence of problem-state end) are created in problem state memory. The execution semantics of functions such as new-device, finish-device, etc. are modified to create the device nodes in problem state memory.

(6) problem-state end: A new FCode function indicating that creating device nodes in problem state memory by problem-state start has ended, and that subsequent device nodes are created in privileged memory. The execution semantics of functions such as new-device, finish-device, etc. are restored to their definitions prior to the execution of problem-state start.

During the evaluation of the FCode in step 108 (see FIG. 1B), methods are created (see step 110 of FIG. 1B). One or more of these methods may need to use a method defined in another device node. For example, some of the methods in privileged nodes need to be accessed by a problem node. The methods in the privileged nodes are made accessible to the problem node by the execute-device-method mechanism defined by the IEEE 1275 standard. A method in the problem node may execute execute-device-method, which in turn makes a system call with a well-established interface.

For example, a problem state node can use the execute-device-method mechanism to log an error. In this example, the node/packages/gui is a privileged node and the interface includes the following buffers:

Buffer1: method-name

Buffer2: device-name

Buffer3: node-id of the device node that makes the system call.

Buffer 1 is located at a predefined address with a predefined length.

This example is implemented with the following code:

```
node-id value h# A0B2
code ^ <sys-call>
    h# 44000002 w,   \ assembler code for system call
;c
: sys-call
    ^<sys-call>
;
\ This method copies the node name and method name
\ and node-id to the interface buffers and makes the system call
: execute-device-method ( node-name len method-name len -- ... t|f )
    buffer1 swap move           \ copy the method name
    buffer2 swap move           \ copy the node name
    node-id to buffer3          \ copy the node-id
    sys-call
;
: log-the-error
    " /packages/gui" " log-error" execute-device-method drop
;
```

Instance Creation

Since the present invention allocates a portion of system memory to privileged state memory and another portion to problem state memory, instance creation can be divided into four categories:

(a) Instance creation of a privileged node by a problem node: Every privileged node has two sets of method lists and property lists. One set is used when executing methods from a privileged state and the other set is used when executing methods from a problem state. When an instance of a privileged node is created under a problem node (i.e., by a method in the problem node), then the problem set of data (i.e., word lists, etc.) is copied into the problem state memory of the problem node. That is, the instance of the privileged node is created in an area of problem state memory.

(b) Instance creation of a problem node by a privileged node: First, the privileged node's problem data is copied into an area of problem state memory. Second, the problem node's data is copied into the same area of problem state memory. As in (a), the instance is created in an area of problem state memory.

(c) Instance creation of a problem node by a problem node: The instance of a first problem node is created under a second problem node (i.e., by a method of the second problem node).

(d) Instance creation of a privileged node by a privileged node: The instance of a first privileged node is created under a second privileged node (i.e., by a method of the second privileged node). Of categories (a) through (d) above, only category (d) is addressed by systems employing conventional FCode probing.

Figure 4:
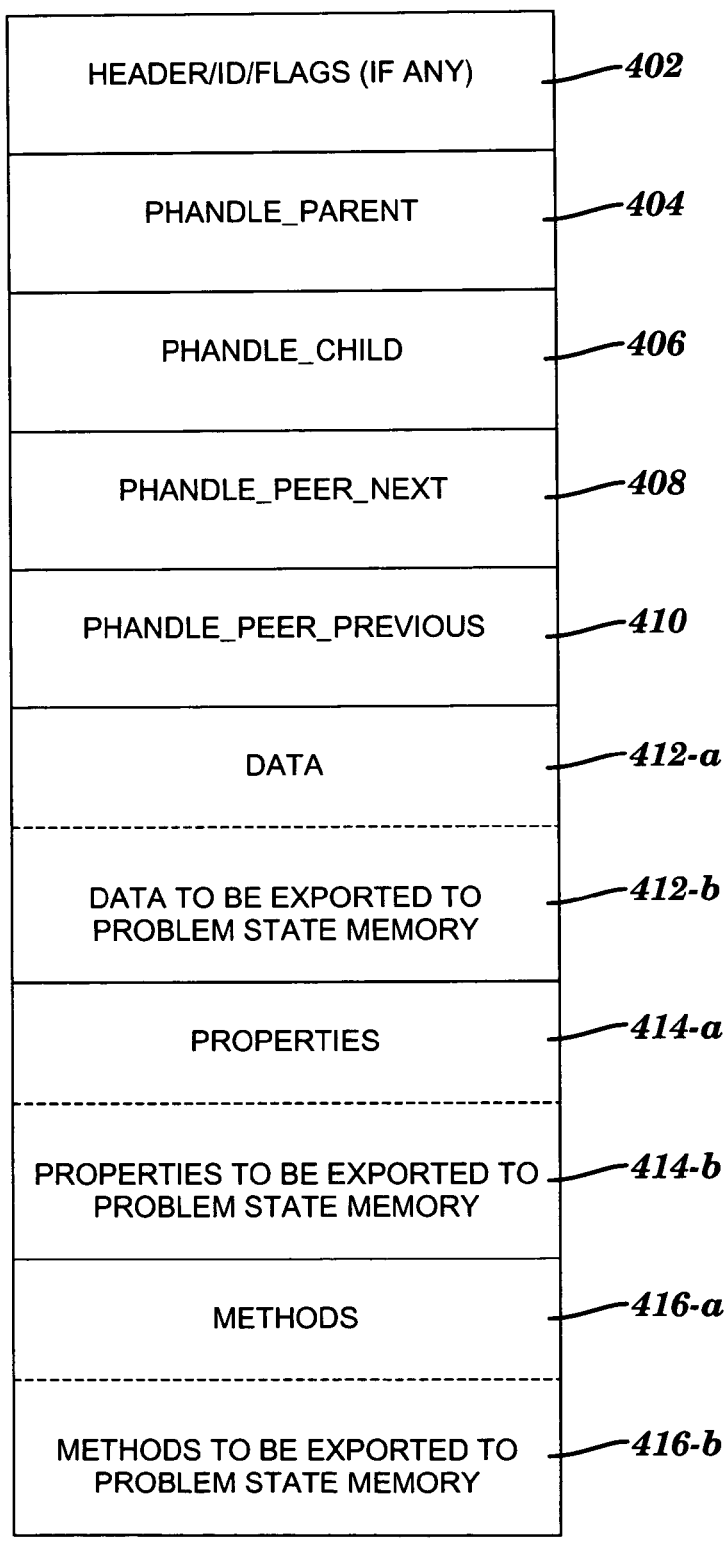
FIG. 4 depicts a privileged state package of the device tree of FIG. 3, in accordance with embodiments of the present invention.

FIG. 4 is an example of a privileged device node 400 (i.e., privileged package) for which an instance may be created by the instance creation of category (a) presented above. Privileged device node 400 is, for instance, one of the nodes of device tree 300 (see FIG. 3) that reside in privileged state memory. Privileged device node 400 includes a header, identification, and/or one or more flags 402 and phandles identifying the parent 404, child 406, next peer 408 and previous peer 410 of device node 400. Privileged device node 400 also includes data 412-a which is visible (i.e., available) only to privileged node methods, data 412-b that the privileged node exports to problem state memory in response to an instance of node 400 being created by a method in a problem state node (i.e., an instance creation in category (a) above). Further, privileged device node 400 includes one or more properties 414-a, which are visible only to privileged node methods, and one or more properties 414-b, which are exported to problem state memory under a category (a) instance creation. Still further, privileged device node 400 includes one or more methods 416-a, which are visible only to privileged node methods, and one or more methods 416-b, which are exported to problem state memory under a category (a) instance creation.

Figure 5:
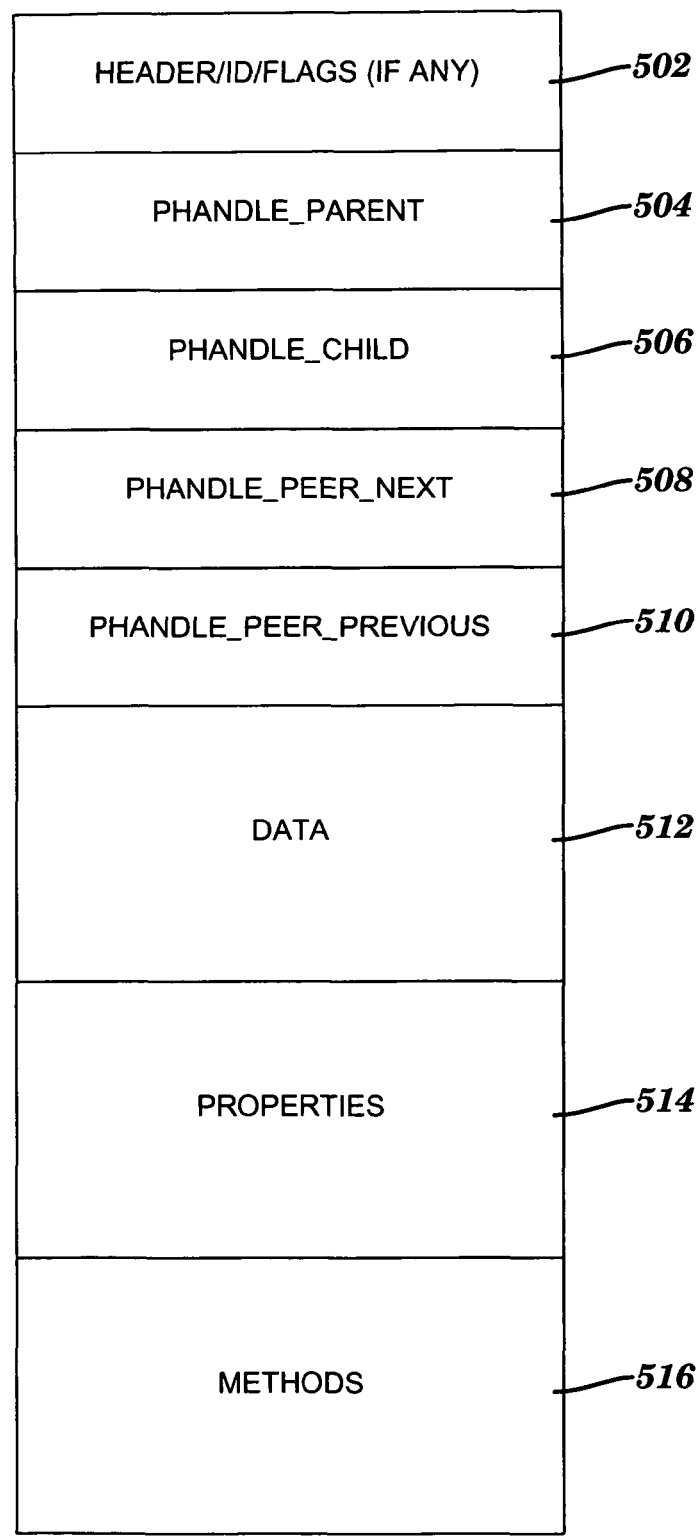
FIG. 5 depicts a problem state package of the device tree of FIG. 3, in accordance with embodiments of the present invention.

FIG. 5 depicts a problem state device node 500 of the device tree of FIG. 3, in accordance with embodiments of the present invention. Problem state device node 500 includes a header, ID, and flags 502, phandle identifications for the parent 504, child 506, next peer 508 and previous peer 510 nodes of problem state node 500. Problem state node. 500 also includes data 512, properties 514 and methods 516. FIG. 5 illustrates a typical problem state node for which an instance is created in category (b) or (c) instance creations described above.

Computing System

FIG. 6 is a block diagram of a computing system 600 for implementing the method of FIG. 1B, in accordance with embodiments of the present invention. Computing system 600 is one implementation of computing system 14 (see FIG. 1A), and generally comprises a central processing unit (CPU) 602, a memory 604, an input/output (I/O) bus bridge 606, a system bus 608, at least one PCI host bridge 610, at least one PCI-PCI bridge 612, and PCI adapters (i.e., PCI cards) 614, 616. CPU 602 performs computation and control functions of computing system 600. CPU 602 may comprise a single processing unit, or be distributed across one or more processing units in one or more locations (e.g., on a client and server). Memory 604 may comprise any known type of data storage and/or transmission media, including magnetic media, optical media, random access memory (RAM), read-only memory (ROM), a data cache, a data object, etc. Storage unit 618 is, for example, a magnetic disk drive or an optical disk drive. Moreover, similar to CPU 602, memory 604 may reside at a single physical location, comprising one or more types of data storage, or be distributed across a plurality of physical systems in various forms. Further, memory 604 can include data distributed across, for example, a LAN, WAN or storage area network (SAN) (not shown).

System bus 608 provides a communication link between each of the components in computing system 600, and may comprise any type of transmission link, including electrical, optical, wireless, etc. I/O bus bridge 606 is connected to system bus 608 and provides an interface to an I/O bus 609. A memory controller/cache (not shown) may be integrated with I/O bus bridge 606.

PCI host bridge 610 connected to I/O bus 609 provides an interface to a primary PCI local bus 611. One or more PCI I/O adapters 614, 616 may be connected to primary PCI bus 611 via respective secondary PCI buses 613, 615 and a PCI-PCI bridge 612. One example of a PCI-PCI bridge is an external address strobe (EADS). Typical PCI bus implementations support between four and eight PCI I/O adapters (i.e., expansion slots for add-in connectors). Each PCI I/O adapter 614, 616 provides an interface between computing system 600 and I/O devices such as other network computers which are clients to computing system 600, modems, graphics adapters, hard disks, optical disk drives, etc.

PCI-PCI bridge 612 supports hot plugging of PCI I/O adapters on the secondary PCI buses 613, 615. Hot plugging allows the addition, removal, and replacement of PCI I/O adapters 614, 616 during runtime. Each PCI adapter 614, 616 has its own secondary PCI bus 613, 615, which makes hot plugging possible. PCI-PCI bridge 612 may be configured to function as a bridge from primary PCI bus 611 to up to eight secondary hot plug PCI buses (e.g., secondary buses 613, 615).

Although not shown in the system of FIG. 6, additional PCI host bridges may be connected to I/O bus 609 to provide interfaces for additional primary PCI buses, each of which is connected to one of a plurality of additional PCI-PCI bridges, other than PCI-PCI bridge 612. Each of the additional PCI-PCI bridges is connected to additional secondary PCI buses, each of which is connected to one of a plurality of PCI I/O adapters, other than PCI I/O adapters 614, 616.

Memory 604 includes open firmware 620, which includes computer program code comprising an FCode probing system 622 that implements logic of the method of FIG. 1B. FCode probing system 622 includes the FCode evaluator that reads FCode 18 (see FIG. 1A) from PCI card 12 (see FIG. 1A), converts the FCode from a binary format into machine code, copies the machine code into problem state memory, and starts executing the machine code. Further, memory 604 may include other systems not shown in FIG. 6, such as an operating system (e.g., Linux) that runs on CPU 602 and provides control of various components within and/or connected to computing system 600.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 622 for use by or in connection with a computing system 600 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM, ROM, a rigid magnetic disk and an optical disk. Current examples of optical disks include compact disk-read-only memory (CD-ROM), compact disk-read/write (CD-R/W) and DVD.

A computing system 600 suitable for storing and/or executing program code 622 includes at least one processor 602 coupled directly or indirectly to memory elements 604 through a system bus 608. The memory elements can include local memory employed during actual execution of the program code, bulk storage, and cache memories which provide temporary storage of at least some program code in order to reduce the number of times code must be retrieved from bulk storage during execution.

Furthermore, the present invention discloses a method for deploying or integrating computing infrastructure, comprising integrating computer-readable code into computer system 600, wherein the code in combination with computer system 600 is capable of probing FCode in problem state memory. The disclosed method for deploying or integrating computing infrastructure with the capabilities described herein can be offered as a service on a subscription service.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of probing FCode in a problem state memory in a computing environment, the method comprising:
    allocating memory space to Open Firmware residing in a computing system, the memory space divided into a problem state memory and a privileged state memory;
    detecting a peripheral device connected to the computing system, wherein the peripheral device includes memory in which FCode resides, and wherein the detecting is performed by a first device node included in a device tree provided by the Open Firmware;
    creating a second device node in the device tree, wherein the second device node includes a package, wherein the package consists of private data, properties and methods of the second device node, wherein the package is associated with the peripheral device, and wherein the second device node resides in the problem state memory;
    switching an active package managed by the Open Firmware to the package included in the second device node, the active package including methods accessible to a command interpreter of the computing system; and
    the Open Firmware performing an FCode probing that includes evaluating the FCode at runtime in a non-privileged operating state (problem state) of a processor of the computing system, wherein no privileged operations are performed in the problem state, wherein the FCode probing at runtime in the problem state includes protecting from disablement an operating system that is running and co-existing in the memory space with the Open Firmware, wherein the evaluating the FCode includes:
    reading the FCode from the peripheral device;
    converting the FCode into a machine code version of the FCode;
    copying the machine code version of the FCode into the problem state memory; and
    executing the machine code version of the FCode in the problem state memory, wherein the executing includes generating and adding to the package in the problem state memory, at least one of: additional private data, an additional one or more properties and an additional one or more methods.

2. The method of claim 1, further comprising:
    responsive to the generating and the adding to the package, the Open Firmware switching the active package from the second device node to the first device node; and
    the Open Firmware switching the processor of the computing system from running in the problem state to running in a privileged state in which the privileged operations are performed.

3. The method of claim 2, wherein the switching the active package from the second device node to the first device node is performed by a system call interrupt.

4. The method of claim 1, wherein the creating comprises:
    executing a first function to indicate that the second device node is to be created in the problem state memory, wherein the executing the first function includes changing definitions of execution semantics of a plurality of FCode functions to facilitate the creating the second device node that resides in the problem state memory; and
    executing a second function to indicate that a device node created subsequent to the second device node is to be created in the privileged state memory, wherein the executing the second function includes restoring definitions of the execution semantics to a state existing before the executing the first function.

5. A system including a processor for probing FCode in a problem state memory in a computing environment, the system comprising:
    means for allocating memory space to Open Firmware residing in a computing system, the memory space divided into a problem state memory and a privileged state memory;
    means for detecting a peripheral device connected to the computing system, wherein the peripheral device includes memory in which FCode resides, and wherein the detecting is performed by a first device node included in a device tree provided by the Open Firmware;
    means for creating a second device node in the device tree, wherein the second device node includes a package, wherein the package consists of private data, properties and methods of the second device node, wherein the package is associated with the peripheral device, and wherein the second device node resides in the problem state memory;

means for switching an active package managed by the Open Firmware to the package included in the second device node, the active package including methods accessible to a command interpreter of the computing system; and means for performing an FCode probing that includes means for evaluating the FCode at runtime in a non-privileged operating state (problem state) of a processor of the computing system, wherein no privileged operations are performed in the problem state, wherein the FCode probing at runtime in the problem state includes protecting from disablement an operating system that is running and co-existing in the memory space with the Open Firmware, wherein the evaluating the FCode includes:

reading the FCode from the peripheral device;
converting the FCode into a machine code version of the FCode;
copying the machine code version of the FCode into the problem state memory; and
executing the machine code version of the FCode in the problem state memory, wherein the executing includes generating and adding to the package in the problem state memory, at least one of: additional private data, an additional one or more properties and an additional one or more methods.

6. The system of claim 5, further comprising:
means for switching, responsive to the generating and the adding to the package, the active package from the second device node to the first device node; and
means for switching the processor of the computing system from running in the problem state to running in a privileged state in which the privileged operations are performed.

7. The system of claim 6, wherein the means for switching the active package from the second device node to the first device node includes a means for providing a system call interrupt.

8. The system of claim 5, wherein the means for creating comprises:
means for executing a first function to indicate that the second device node is to be created in the problem state memory, wherein the executing the first function includes changing definitions of execution semantics of a plurality of FCode functions to facilitate creating the second device node that resides in the problem state memory; and
means for executing a second function to indicate that a device node created subsequent to the second device node is to be created in the privileged state memory, wherein the executing the second function includes restoring definitions of the execution semantics to a state existing before the executing the first function.

9. A computer program product comprising a computer readable storage medium having a computer readable program code stored therein, said computer readable program code containing instructions configured to be executed by a processor of a computing system to implement a method of probing FCode in a problem state memory in a computing environment, said method comprising:

allocating memory space to Open Firmware residing in the computing system, the memory space divided into a problem state memory and a privileged state memory;

detecting a peripheral device connected to the computing system, wherein the peripheral device includes memory in which FCode resides, and wherein the detecting is performed by a first device node included in a device tree provided by the Open Firmware;

creating a second device node in the device tree, wherein the second device node includes a package, wherein the package consists of private data, properties and methods of the second device node, wherein the package is associated with the peripheral device, and wherein the second device node resides in the problem state memory;

switching an active package managed by the Open Firmware to the package included in the second device node, the active package including methods accessible to a command interpreter of the computing system; and the Open Firmware performing an FCode probing that includes evaluating the FCode at runtime in a non-privileged operating state (problem state) of a processor of the computing system, wherein no privileged operations are performed in the problem state, wherein the FCode probing at runtime in the problem state includes protecting from disablement an operating system that is running and co-existing in the memory space with the Open Firmware, wherein the evaluating the FCode includes:

reading the FCode from the peripheral device;
converting the FCode into a machine code version of the FCode;
copying the machine code version of the FCode into the problem state memory; and
executing the machine code version of the FCode in the problem state memory, wherein the executing includes generating and adding to the package in the problem state memory, at least one of: additional private data, an additional one or more properties and an additional one or more methods.

10. The program product of claim 9, wherein said method further comprises:
responsive to the generating and the adding to the package, the Open Firmware switching the active package from the second device node to the first device node; and
the Open Firmware switching the processor of the computing system from running in the problem state to running in a privileged state in which the privileged operations are performed.

11. The program product of claim 10, wherein the switching the active package from the second device node to the first device node is performed by a system call interrupt.

12. The program product of claim 9, wherein the creating the second device node in the device tree comprises:
executing a first function to indicate that the second device node is to be created in the problem state memory, wherein the executing the first function includes changing definitions of execution semantics of a plurality of FCode functions to facilitate the creating the second device node that resides in the problem state memory; and
executing a second function to indicate that a device node created subsequent to the second device node is to be created in the privileged state memory, wherein the executing the second function includes restoring definitions of the execution semantics to a state existing before the executing the first function.

13. A method for deploying computing infrastructure, comprising integrating computer-readable code into a computing system, wherein the code in combination with the computing system is capable of performing a process of probing FCode in a problem state memory in a computing environment, the process comprising:
  allocating memory space to Open Firmware residing in a computing system, the memory space divided into a problem state memory and a privileged state memory;
  detecting a peripheral device connected to the computing system, wherein the peripheral device includes memory in which FCode resides, and wherein the detecting is performed by a first device node included in a device tree provided by the Open Firmware;
  creating a second device node in the device tree, wherein the second device node includes a package, wherein the package consists of private data, properties and methods of the second device node, wherein the package is associated with the peripheral device, and wherein the second device node resides in the problem state memory;
  switching an active package managed by the Open Firmware to the package included in the second device node, the active package including methods accessible to a command interpreter of the computing system; and
  the Open Firmware performing an FCode probing that includes evaluating the FCode at runtime in a non-privileged operating state (problem state) of a processor of the computing system, wherein no privileged operations are performed in the problem state, wherein the FCode probing at runtime in the problem state includes protecting from disablement an operating system that is running and co-existing in the memory space with the Open Firmware, wherein the evaluating the FCode includes:
    reading the FCode from the peripheral device;
    converting the FCode into a machine code version of the FCode;
    copying the machine code version of the FCode into the problem state memory; and
    executing the machine code version of the FCode in the problem state memory, wherein the executing includes generating and adding to the package in the problem state memory, at least one of: additional private data, an additional one or more properties and an additional one or more methods.

14. The method of claim 13, wherein the process further comprises:
  responsive to the generating and the adding to the package, the Open Firmware switching the active package from the second device node to the first device node; and
  the Open Firmware switching the processor of the computing system from running in the problem state to running in a privileged state in which the privileged operations are performed.

15. The method of claim 1, wherein the executing the machine code version of the FCode in the problem state memory includes:
  generating the additional private data; and
  in the problem state memory, adding the additional private data to the package included in the second device node.

16. The method of claim 1, wherein the executing the machine code version of the FCode in the problem state memory includes:
  generating the additional one or more properties; and
  in the problem state memory, adding the additional one or more properties to the package included in the second device node.

17. The method of claim 1, wherein the executing the machine code version of the FCode in the problem state memory includes:
  generating the additional one or more methods; and
  in the problem state memory, adding the additional one or more methods to the package included in the second device node.

* * * * *